United States Patent [19]

Weeder

[11] Patent Number: 4,550,860
[45] Date of Patent: Nov. 5, 1985

[54] PLANTER POPULATION REDUCTION DRIVE UNIT

[76] Inventor: Ralph E. Weeder, Box 83, Lindsay, Nebr. 68644

[21] Appl. No.: 288,642

[22] Filed: Jul. 30, 1981

[51] Int. Cl.$^4$ ............................................. A01C 19/00
[52] U.S. Cl. ................................... 222/615; 222/616; 74/325; 474/74
[58] Field of Search ............... 222/613, 614, 615, 616; 474/73, 74, 76; 74/325, 368, 362, 366, 329; 29/148.3, 401.1; 111/34, 36, 37

[56] References Cited

U.S. PATENT DOCUMENTS 3,581,853  6/1971  Hoff ....................................... 474/74
3,581,950  6/1971  Miller .................................. 222/615
4,175,448  10/1979  Loew et al. .......................... 74/335
4,251,014  2/1981  Salley et al. ........................ 222/615

OTHER PUBLICATIONS

Descriptive Literature of John Deere 7000/7100 Series Planters.

Primary Examiner—H. Grant Skaggs
Assistant Examiner—Andrew Jones
Attorney, Agent, or Firm—Zarley, McKee, Thomte, Voorhees & Sease

[57] ABSTRACT

A planter population reduction drive system includes a third shaft adapted to be added onto a planter implement transmission unit having existing first and second shafts. The individual planter units are driven by the second shaft which is connected by a series of adjustable sprockets to the first shaft for a selected population rate. The new third shaft is driven by the ground wheels and includes primary and secondary chain drive connections to the first shaft. A normally engaged wrap spring clutch on the third shaft normally provides for the transmission of torque from the third shaft to the first shaft but when the wrap spring clutch is disengaged, torque is transmitted through a secondary drive sprocket which is mounted on the third shaft by an over running clutch.

4 Claims, 5 Drawing Figures

PLANTER POPULATION REDUCTION DRIVE UNIT

BACKGROUND OF THE INVENTION

The present invention is directed generally to an improvement for the transmission of an agricultural planter implement which enables the selected planting population rate to be further reduced at times from the tractor operator's station to accommodate driving from irrigated to non-irrigated land, for example.

Most agricultural planter implements are equipped with adjustable transmissions for selecting a desired planting population rate. This rate is set by training a chain around a selected pair of various sized sprockets on a pair of the transmission shafts. Since readjustment of the transmission sprockets requires the implement to be disabled for approximately two to ten minutes, this is not a practical means for repeatedly adjusting the population rate at short intervals.

A variable speed belt drive system has been proposed which can be operated from the tractor cab while continuously planting but the belts are not easily controlled and adjustments require considerable time. The variable pulleys for the belts are electrically controlled and monitored. The implement may traverse a couple of hundred yards by the time the pulleys are adjusted, monitored and corrected for any over or under adjustment.

Other planter implements have hydraulic population adjustment devices but these require an extra hydraulic outlet on the tractor and are practically prohibitively expensive.

These and other problems of the prior art are believed to be resolved by the present invention.

Accordingly, a primary object of the present invention is to provide an improved planter population reduction drive unit.

Another object is to provide a population reduction drive unit which is capable of precise and practically immediate population rate adjustments.

Another object is to provide a population reduction drive unit which may be quickly and easily operated from the tractor cab to adjust the population rate while continuously planting.

Another object is to provide a population reduction drive unit which is adapted for installation on existing planter implements.

Finally, an object is to provide a population reduction drive unit which is rugged in construction, economical to manufacture and efficient and dependable in operation.

SUMMARY OF THE INVENTION

The planter population reduction drive unit of the present invention includes an auxiliary shaft mounted on the transmission unit of the planter implement. The direct drive chain from the ground wheels or ground wheel shaft is connected to a fixed sprocket on the auxiliary shaft. A wrap spring clutch on the auxiliary shaft is normally engaged for providing a primary chain drive connection between a primary drive sprocket on the wrap spring clutch and a primary driven sprocket on one of the existing transmission shafts. The auxiliary shaft also carries an over running clutch having a secondary drive sprocket connected by chain to another sprocket on the same transmission shaft. The primary chain drive connection may provide a direct drive relation between and auxiliary and transmission shafts whereas the secondary chain drive connection will effect a speed reduction in the transmission shaft for reducing the effective population setting.

The over running clutch enables the secondary drive sprocket to simply free wheel on the auxiliary shaft when the wrap spring clutch is engaged but transmits the driving force to the transmission shaft when the wrap spring clutch is disengaged. An electrically actuated solenoid is provided on the wrap spring clutch for quickly and easily engaging and disengaging the same from the tractor cab.

A farmer need only adjust the planter implement transmission for the desired population planting rate for irrigated soil and then proceed to plant knowing that he can quickly and easily reduce the planting population rate by disengaging the wrap spring clutch when driving onto non-irrigated land such as the corners of sections irrigated by center pivot irrigation systems.

DESCRIPTION OF THE PREFERRED EMBODIMENT

Figure 1:
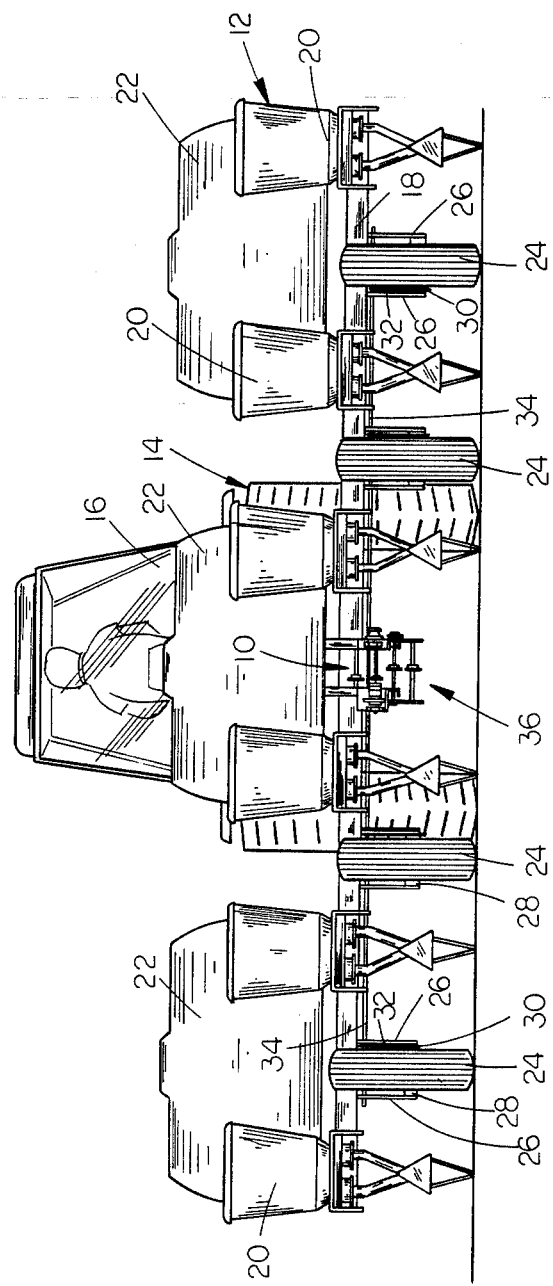
FIG. 1 is a rear elevational view of a tractor and planter implement equipped with the present invention.

The planter population reduction drive system 10 of the present invention is shown in FIG. 1 installed on an agricultural planter implement 12 which is connected to a tractor 14 having an operator's cab 16.

Planter implement 12 is conventional and includes an elongated tool bar 18 having a plurality of individual planter units 20, liquid tanks 22 and ground wheels 24 supported thereon. Each ground wheel 24 is rotatably supported between depending frame supports 26 on a shaft 28 equipped with a sprocket 30 for connection by a chain 32 to a transverse ground wheel shaft 34 on the underside of tool bar 18. Ground wheel shaft 34 delivers the drive power to the planter implement transmission indicated generally at 36.

Figure 2:
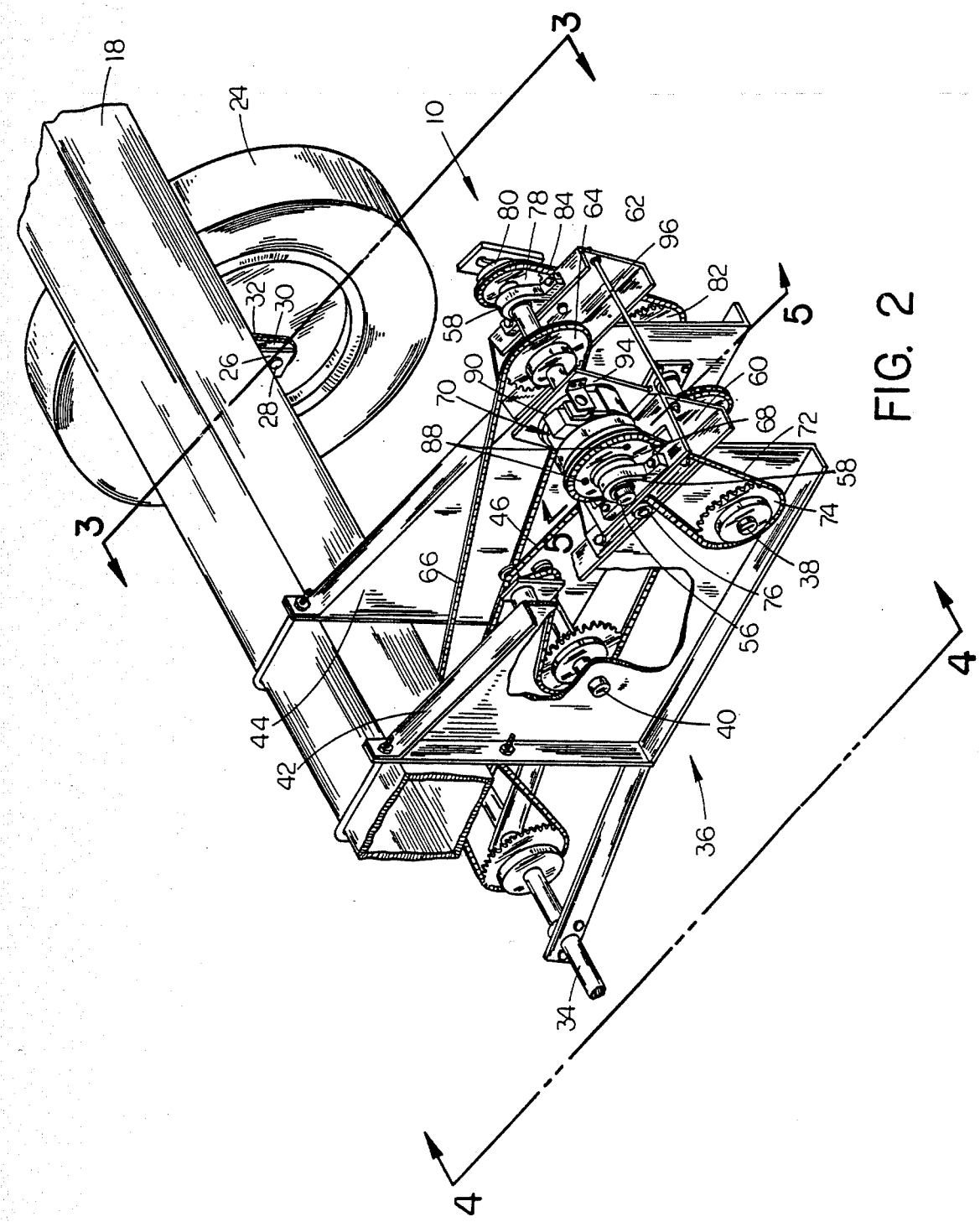
FIG. 2 is an enlarged detail perspective view of the planter population reduction drive unit with portions broken away for clarity.
Figure 3:
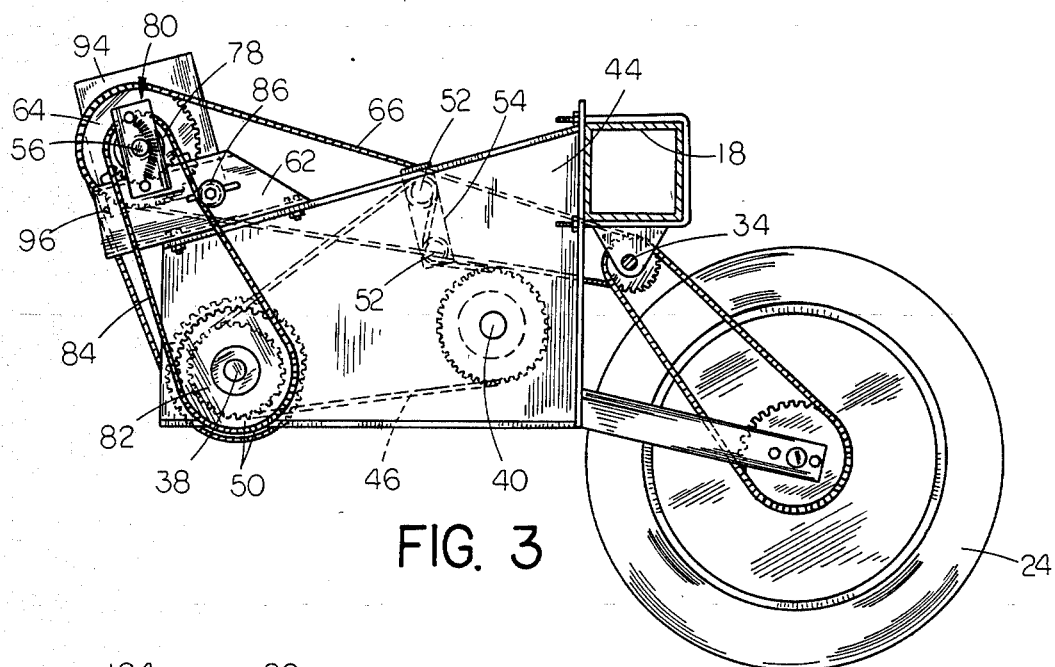
FIG. 3 is a side sectional view taken along line 3—3 in FIG. 2.

Transmission 36 is shown in FIG. 2 as including first and second transmission shafts 38 and 40 transversely extended between and rotatably supported on a pair of rearwardly extended frame members 42 and 44. The second transmission shaft 40 is operatively connected by conventional means (not shown) to each of the planter units 20 for operating the units in response to rotation of the second shaft 40. The second shaft 40 is driven by the first shaft 38 by means of chain 46. First shaft 38 carries a plurality of sprockets 48 of various sizes and second shaft 40 carries a plurality of sprockets 50 of various sizes. By training chain 46 about a selected pair of the coacting sprockets 48 and 50, the farmer can select the desired planting population rate corresponding to that particular pair of sprockets. A pair of chain slack take-up pulleys 52 are rotatably mounted on a pivotally adjustable lever 54 to maintain tension in chain 46 for all possible sprocket selections.

Conventionally, the first transmission shaft 38 is driven directly from the ground wheel shaft 34. In the present invention, however, the reduction drive system 10 is interposed between the ground wheel shaft 34 and first shaft 38 as described hereinbelow.

The planter population reduction drive system 10 includes a third shaft 56 rotatably supported in pillow block bearings 58 which are mounted on the upper webs of a pair of channel supports 60 and 62. A sprocket 64 is fixed on third shaft 56 for receiving chain 66 and drivingly connecting third shaft 56 to the ground wheel shaft 34.

A pair of alternate chain drive connections are provided between the third shaft 56 and first shaft 38. The primary chain drive connection includes a primary drive sprocket 68 which is connected to third shaft 56 by a wrap spring clutch 70. Sprocket 68 is connected by chain 72 to the primary driven sprocket 74 on first shaft 38. An adjustable pulley 76 is provided on channel support 60 to maintain tension in chain 72.

The secondary chain drive connection includes a secondary drive sprocket 78 which is connected to third shaft 56 by an over running clutch 80. Sprocket 78 is connected to a secondary driven sprocket 82 on first shaft 38 by a chain 84 which has its tension maintained by an adjustable pulley 86.

Wrap spring clutch 70 may be of any commercially available type such as that manufactured by Warner Electric Brake and Clutch Company of Beloit, Wisconsin, whose wrap spring clutches are manufactured by the PSI Division in Pitman, New Jersey. Their PSI series wrap spring clutch, Model "SS" has been satisfactorily used.

Figure 5:
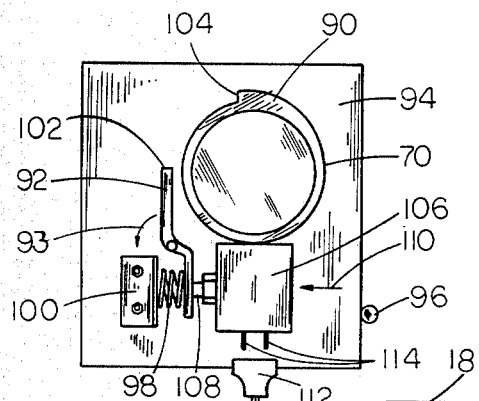
FIG. 5 is a sectional view taken along line 5—5 in FIG. 2 showing the solenoid control for the wrap spring clutch.
Figure 4:
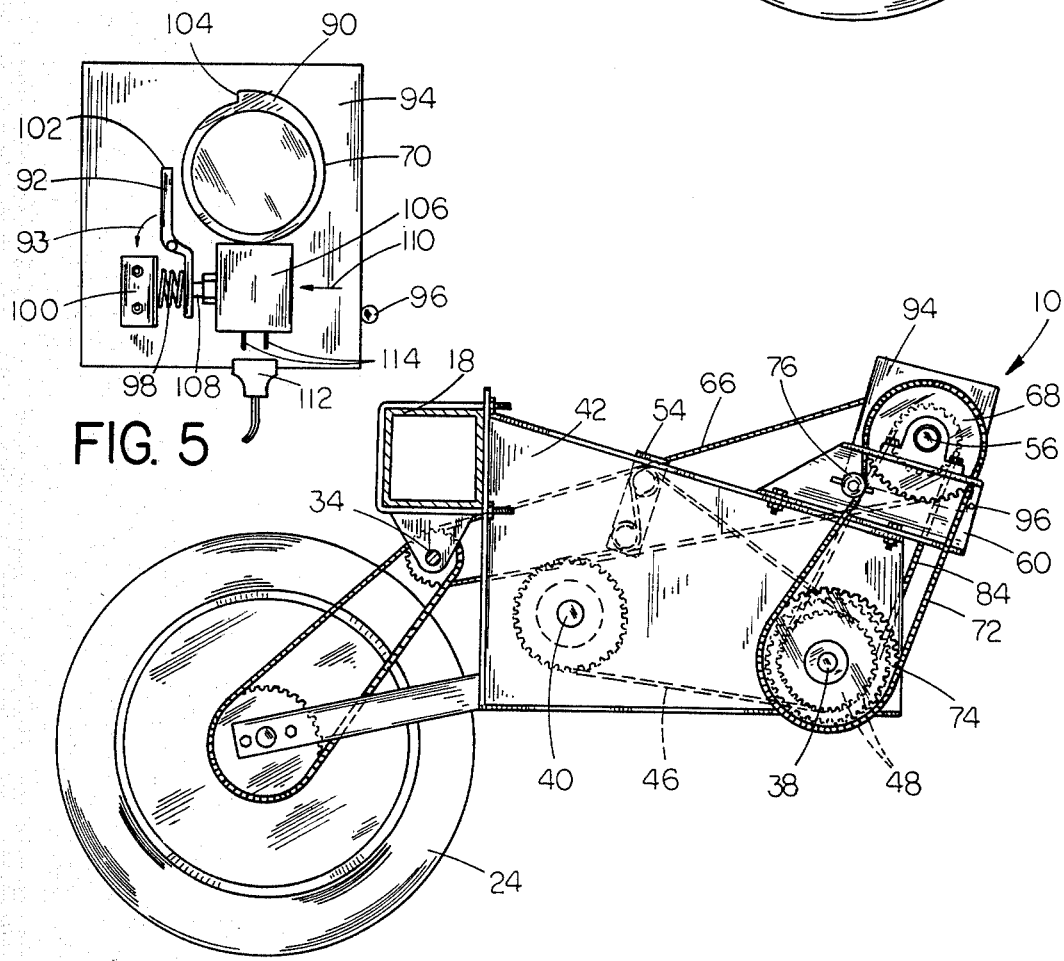
FIG. 4 is a side sectional view taken along line 4—4 in FIG. 2.

Wrap spring clutch 70 has an output hub to which the primary drive sprocket 68 is connected by bolts 88 and an input hub on the opposite end. An internal drive spring is operative to connect the input and output hubs for rotation in unison when rotation of its surrounding control collar 90 is not blocked. The blocking and releasing of control collar 90 is controlled by a lever 92 which is pivotally supported on plate 94 which is prevented from rotation by abutment against rod 96 which is extended between channel supports 60 and 62. Referring to FIG. 5, a compression spring 98 which is mounted on bracket 100 urges lever 92 to rotate in the direction of arrow 93, thereby moving the flat end 102 of lever 92 from the stop shoulder 104 on control collar 90 for free rotation of the control collar 90. Wrap spring clutch 70 is thus engaged for driving primary drive sprocket 68.

To disengage the wrap spring clutch 70, a solenoid 106 which is mounted on plate 94 has a core 108 connected to lever 92. Upon actuation of solenoid 106, core 108 is forced outwardly in the direction of arrow 110 against the urging of spring 98 thereby rotating levers 92 into blocking engagement against shoulder 104. Accordingly, wrap spring clutch is disengaged whereupon the rotational torque of third shaft 56 is thereafter transmitted to first shaft 38 by means of the secondary drive sprocket 78.

The primary drive sprocket 68 and primary driven sprocket 74 may have an equal number of teeth for a direct drive relation between these shafts. The secondary drive sprocket 78, on the other hand, has a fewer number of teeth than the secondary driven sprocket 82 for a resulting speed reduction of first shaft 38 relative to third shaft 56. One suitable arrangement is for the primary sprocket to have 34 teeth and the secondary drive sprocket 78 and driven sprocket 82 to have 16 and 24 teeth, respectively. The exact number of teeth and sprocket ratios generally are not critical to the present invention. It is only important that the secondary drive connection afford a speed reduction relative to the primary drive connection.

Solenoid 106 may be remotely operated from the tractor cab 16 by an electrical circuit including a cab mounted switch, the tractor battery and a plug 112 adapted for connection to the spade terminals 114 of the solenoid as seen in FIG. 5.

In operation, the farmer need only select the pair of coacting sprockets 48 and 50 on first and second shafts 38 and 40 which correspond to the desired planting population rate for irrigated soil, for example. Since the wrap spring clutch is normally engaged due to the releasing action of spring 98 against lever 92, drive power is normally transmitted from the ground wheel shaft 34 to the third shaft 56 and then to the first shaft 38 by the primary drive connection through wrap spring clutch 70. When the farmer drives onto dry non-irrigated land at the corner of a section, for example, he need only flip the switch in the cab to electrically actuate solenoid 106 to disengage wrap spring clutch 70 whereupon the planting population rate is immediately reduced to the lower rate afforded by the secondary drive connection between third shaft 56 and first shaft 38. As the tractor moves back onto irrigated soil, the farmer again simply flips the cab mounted switch to deactuate solenoid 106 whereupon spring 98 releases lever 92 from the control collar 90 of wrap spring 70, and the planting rate is again stepped up to the rate associated with the primary drive connection between the third and first shafts.

Whereas a preferred embodiment of the invention has been shown and described herein, it will be understood that there are many modifications, substitutions and alterations which come within the intended broad scope of the appended claims. The invention has been illustrated in association with the chain drive transmission of a John Deere planter implement. It will be apparent that the reduction drive system of the present invention is equally applicable for use on the transmissions of other manufacturers.

Furthermore, whereas the invention has been disclosed in connection with a chain driven transmission, the population reduction drive system of the present invention would be equally applicable to transmissions driven by gears, belts, or otherwise.

Finally, there has been disclosed herein a method for modifying the transmission of an agricultural planter implement to provide for a reduced population planting rate at times.

A timely advantage of the control system of the invention is its energy efficiency. The solenoid actuated wrap spring clutch requires less than 2 amps for disengaging the clutch and no power at all for engaging the clutch since this is accomplished mechanically by spring 98.

Thus there has been shown and described a planter population reduction drive system which accomplishes at least all of the stated objects.

I claim:

1. In an agricultural planter implement having an elongated tool bar and a plurality of individual planter units and a plurality of ground wheels connected to the tool bar, a population reduction drive system comprising, first and second shafts rotatably mounted on the implement in spaced-apart relation, means operatively connecting said second shaft to the planter units for operating said units in response to rotation of the second shaft, a plurality of sprockets of various sizes carried on said first and second shafts for rotation therewith, a chain trained about a selected pair of said sprockets for setting the population rate corresponding to that pair, a third shaft rotatably mounted on the implement and having a fixed sprocket secured thereon, chain drive means operatively connected to said fixed sprocket and ground wheels for rotating said third shaft in response to rotation of said ground wheels, a primary chain drive connection between said third and first shafts including a remotely actuated wrap spring clutch mounted on said third shaft, a primary drive sprocket connected to said wrap spring clutch for rotation with said third shaft when said wrap spring clutch is engaged, a primary driven sprocket on said first shaft, and a chain trained around said primary drive sprocket and primary driven sprocket, and a secondary chain drive connection between said third and first shafts including, an over running clutch mounted on said third shaft, a secondary drive sprocket connected to said over running clutch for rotating said third shaft when said wrap spring clutch is disengaged, a secondary driven sprocket on said first shaft, and a chain trained about said secondary drive sprocket and secondary driven sprocket, said wrap spring clutch including a solenoid operatively connected thereto for disengaging said wrap spring clutch in response to actuation of said solenoid and for engaging said wrap spring clutch in response to deactuation of said solenoid.

2. In an agricultural planter implement having an elongated tool bar and a plurality of individual planter units and a plurality of ground wheels connected to the tool bar, a population reduction drive system comprising, first and second shafts rotatably mounted on the implement in spaced-apart relation, means operatively connecting said second shaft to the planter units for operating said units in response to rotation of the second shaft, a plurality of sprockets of various sizes carried on said first and second shafts for rotation therewith, a chain trained about a selected pair of said sprockets for setting the population rate corresponding to that pair, a third shaft rotatably mounted on the implement and having a fixed sprocket secured thereon, chain drive means operatively connected to said fixed sprocket and ground wheels for rotating said third shaft in response to rotation of said ground wheels, a primary chain drive connection between said third and first shafts including a remotely actuated wrap spring clutch mounted on said third shaft, a primary drive sprocket connected to said wrap spring clutch for rotation with said third shaft when said wrap spring clutch is engaged, a primary driven sprocket on said first shaft, and a chain trained around said primary drive sprocket and primary driven sprocket, and a secondary chain drive connection between said third and first shafts including, an over running clutch mounted on said third shaft, a second drive sprocket connected to said over running clutch for rotating said third shaft when said wrap spring clutch is disengaged, a secondary driven sprocket on said first shaft, and a chain trained about said secondary drive sprocket and secondary driven sprocket, said chain drive means operatively connecting said fixed sprocket and ground wheels comprising a ground wheel driven shaft rotatably mounted on said implement, chain drive means operatively connecting said ground wheel driven shaft to at least one of said ground wheels, a drive sprocket fixed on said ground wheel driven shaft and a chain trained about said drive sprocket and fixed sprocket on said third shaft for rotation of said third shaft in response to rotation of the ground wheel driven shaft.

3. The drive system of claim 1 wherein said solenoid is connected to an electrical circuit including a battery and a switch remotely situated from said solenoid for controlling the actuation thereof.

4. The drive system of claim 1 wherein said wrap spring clutch includes a circumferentially extended stop collar having a stop shoulder thereon, a lever pivotally mounted on said implement for pivotal movement between positions in and out of engagement with said stop shoulder, said solenoid connected to said lever for moving it into engagement with said stop shoulder in response to actuation of the solenoid and for moving it out of engagement with said stop shoulder in response to deactuation of the solenoid.

* * * * *